(12) United States Patent
Chapin et al.

(10) Patent No.: US 6,298,188 B1
(45) Date of Patent: Oct. 2, 2001

(54) PLENUM RATED HIGH MODULUS BUFFERED OPTICAL FIBER

(75) Inventors: J. Thomas Chapin, Alpharetta; Montri Viriyayuthakorn, Norcross; Carla G. Wilson, Conyers, all of GA (US)

(73) Assignee: Lucent Technologies Inc., Murray Hill, NJ (US)

( * ) Notice: Subject to any disclaimer, the term of this patent is extended or adjusted under 35 U.S.C. 154(b) by 0 days.

(21) Appl. No.: 09/426,921

(22) Filed: Oct. 22, 1999

(51) Int. Cl.$^7$ .................................................. G02B 6/02
(52) U.S. Cl. ...................... 385/123; 385/128; 385/127; 385/102
(58) Field of Search ................. 385/100, 109, 385/113, 114, 123, 127, 128; 174/107, 121 A; 65/432, 441; 428/36.9; 427/163

(56) References Cited

U.S. PATENT DOCUMENTS

| | | | |
|---|---|---|---|
| 4,510,348 | | 4/1985 | Arroyo et al. ........................ 174/121 |
| 4,605,818 | * | 8/1986 | Arroyo et al. ........................ 174/107 |
| 4,687,294 | * | 8/1987 | Angeles .................................. 385/102 |
| 5,104,433 | * | 4/1992 | Chapin et al. ........................... 65/432 |
| 5,429,849 | * | 7/1995 | Lasson et al. ......................... 428/36.9 |
| 5,636,307 | * | 6/1997 | Cowen et al. .......................... 385/102 |
| 5,684,910 | | 11/1997 | Chapin et al. .......................... 385/128 |
| 5,748,823 | * | 5/1998 | Nave' .................................... 385/113 |
| 5,911,023 | * | 6/1999 | Risch et al. ............................ 385/100 |

FOREIGN PATENT DOCUMENTS

| 07292519 | * | 12/1984 | (JP) . | |
| 59228606 | * | 12/1984 | (JP) .................................. 427/163.2 |

* cited by examiner

Primary Examiner—Frank G. Font
Assistant Examiner—Sang H. Nguyen
(74) Attorney, Agent, or Firm—Thomas, Kayden, Horstemeyer & Risley, LLP

(57) ABSTRACT

The present invention relates to a buffered optical fiber which has a high flame resistance and high modulus. The buffered optical fiber comprises a cladded glassy core through which optical signals can be transmitted, at least one coating layer surrounding the cladded glassy core which protects the core from microbending forces, and a buffer layer material that surrounds the at least one coating layer to form a buffer layer that protects the coated optical fiber from mechanical forces and from flame. In the preferred embodiment, the buffer material comprises homopolymer of polyvinylidine fluoride.

17 Claims, 3 Drawing Sheets

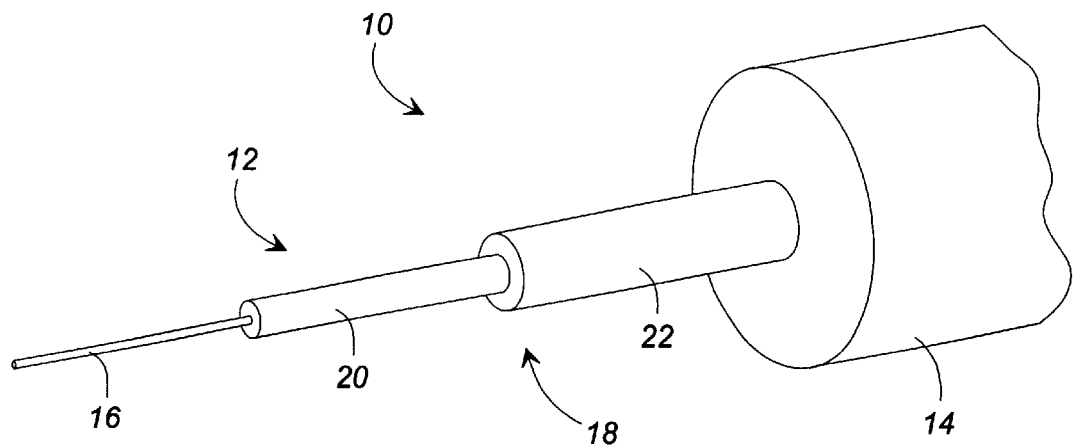
FIG. 1
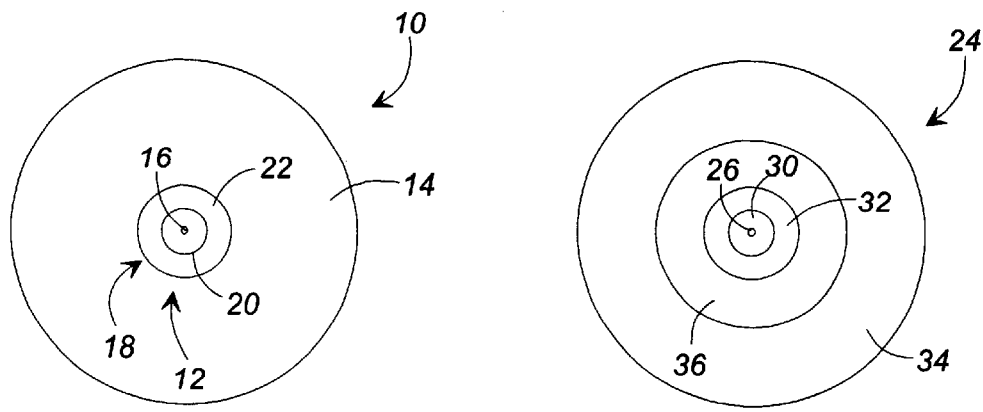
FIG. 2     FIG. 3

PLENUM RATED HIGH MODULUS BUFFERED OPTICAL FIBER

FIELD OF THE INVENTION

The present invention relates generally to buffered optical fibers. More particularly, the invention relates to optical fibers having a high modulus, flame resistant buffer suitable for use in plenum rated optical fiber cables and cordage.

BACKGROUND OF THE INVENTION

In the construction of most commercial buildings, a finished ceiling, commonly referred to as a drop ceiling, is spaced below a structural floor panel that is constructed of concrete, for example. Light fixtures as well as other items are supported by the drop ceiling. The space between the ceiling and the structural floor from which it is suspended serves as a return-air plenum for heating and cooling systems as well as a convenient location for the installation of communication, computer, and alarm system cables and/or cordage. Often, these plenums are continuous throughout the length and width of each floor.

When a fire occurs in the area between a floor and a drop ceiling, it may be contained by walls and other building elements which enclose the area. However, if the fire reaches the plenum, and if combustible material occupies the plenum, the fire can spread quickly throughout an entire story of the building and smoke can be conveyed through the plenum to adjacent areas. In addition, the fire could travel along the length of the cables installed in the plenum. Because of the possibility of flame spread and smoke evolution, particularly when aided by flammable cable or cordage insulation, the National Electric Code (NEC) requires that flammable cables used in plenums be enclosed in metal conduits. However, since rigid metal conduits are difficult to route in plenums congested with other items, the NEC also permits certain exceptions to the metal conduit requirement. For instance, low flame spread, low smoke producing cables are approved for plenum use without metal conduit provided that the cables are approved by an authority such as Underwriter's Laboratories.

Underwriter's Laboratories (UL) has developed a standard for flame propagation and smoke density values for electrical and optical fiber cables used in plenums called UL 910. UL 910 requires that, when tested in accordance with the specific procedures described in the written standard, the optical fiber cable produce (i) a maximum flame propagation distance of no more than five feet; (ii) a peak optical density of smoke no greater than 0. 50; and (iii) an average optical density of smoke of 0.15 or less.

Previously, compliance with UL 910 for optical fiber cable has been obtainable through use of substantially flame resistant cable jackets. Such jackets generally are considered necessary for compliance with UL 910 in that the optical fibers themselves normally are constructed of highly flammable coating materials. Despite the flame resistance provided by such jackets, the high flammability of conventional optical fibers makes complying with UL 910 difficult. Accordingly, those in the art have been searching for an optical fiber which satisfies all of the performance needs of modem communications systems and which is also flame resistant.

Conventional optical fibers typically include a glassy core, cladding, and one or more layers of a coating composed of an acrylate material. Surrounding the coating is at least one further layer of material, commonly referred to as a buffer or buffer layer, which protects the fiber from damage and which provides the appropriate amount of stiffness to the fiber. This buffer layer usually is mechanically stripped away from the fiber when the fiber is connected to an optical fiber connector. Normally, the buffer layer is composed of a thermoplastic polymeric material which is extruded directly over the coated optical fiber. Common materials used to form buffer layers include polyvinyl chloride (PVC), nylon, and polyesters. Of these materials, nylon and polyesters are used most frequently, especially in the manufacture of optical fiber cordage, due to their relatively high modulus. As is known in the art, high modulus is desirable because it facilitates connectorization of optical fibers. However, as is known in the art, nylon and polyesters are also highly flammable.

Although there are several known flame resistant materials currently available, there has been difficulty in the industry in finding a buffer material which provides both a high modulus and the requisite flame resistance. This difficulty is compounded by the fact that other optical fiber design requirements must similarly be satisfied by the selected buffer material. For instance, in addition to high modulus and flame resistance, the finished optical fiber must also satisfy transmission, manufacturing, chemical resistance, and strippability requirements. Satisfaction of each of these requirements greatly complicates the design and development process and has, until now, impeded production of high modulus, flame resistant buffered optical fibers.

From the foregoing, it can be appreciated that it would be desirable to have a high modulus optical fiber which is higher flame resistant and also satisfies transmission, manufacturing, chemical resistance, and strippability requirements so as to be suitable for use in the construction of plenum rated cables and cordage.

SUMMARY OF THE INVENTION

The present invention relates to a buffered optical fiber which has high flame resistance and high modulus. The buffered optical fiber comprises a cladded glassy core through which optical signals can be transmitted, at least one coating layer surrounding the cladded glassy core which protects the core from microbending forces, and a buffer layer material that surrounds the at least one coating layer to form a buffer layer that protects the coated optical fiber from mechanical forces and from flame.

To achieve the desired levels of flame resistance and modulus, the buffer layer material must be carefully selected. After extensive experimentation, the preferred buffer material was determined to comprise a homopolymer of polyvinylidine fluoride.

Several advantages can be realized with the buffered optical fiber of the present invention. As identified in the foregoing, the optical fiber has high modulus. In large part, this modulus is due to the buffer material which has a Young's modulus of approximately 2000 Mpa at approximately 25° C. Indicative of the high flame resistance of the present buffered optical fiber are test results obtained from testing cable containing buffered optical fiber in accordance with UL 910. These test results proved the buffered optical fiber to have a flame spread of no more than approximately 2 ft., a peak optical density of no more than approximately 0.3, and an average optical density of no more than approximately 0.1. With such exemplary flame test results, the buffered optical fiber of the present invention is, as of the time of filing, the only PVDF buffered optical fiber to have qualified as a UL recognized component.

The features and advantages of this invention will become apparent upon reading the following specification, when taken in conjunction with the accompanying drawings. It is intended that all such additional features and advantages be included therein with the scope of the present invention, as defined by the claims.

BRIEF DESCRIPTION OF THE DRAWINGS

The invention can be better understood with reference to the following drawings. The components in the drawings are not necessarily to scale, emphasis instead being placed upon clearly illustrating the principles of the present invention. In the drawings, like reference numerals designate corresponding parts throughout the several views.

FIG. 1 is a side perspective view of a buffered optical fiber constructed in accordance with the present invention.

FIG. 2 is an end view of the optical fiber shown in FIG. 1.

FIG. 3 is an end view of an alternative embodiment of a buffered optical fiber constructed in accordance with the present invention.

DETAILED DESCRIPTION

Figure 4:
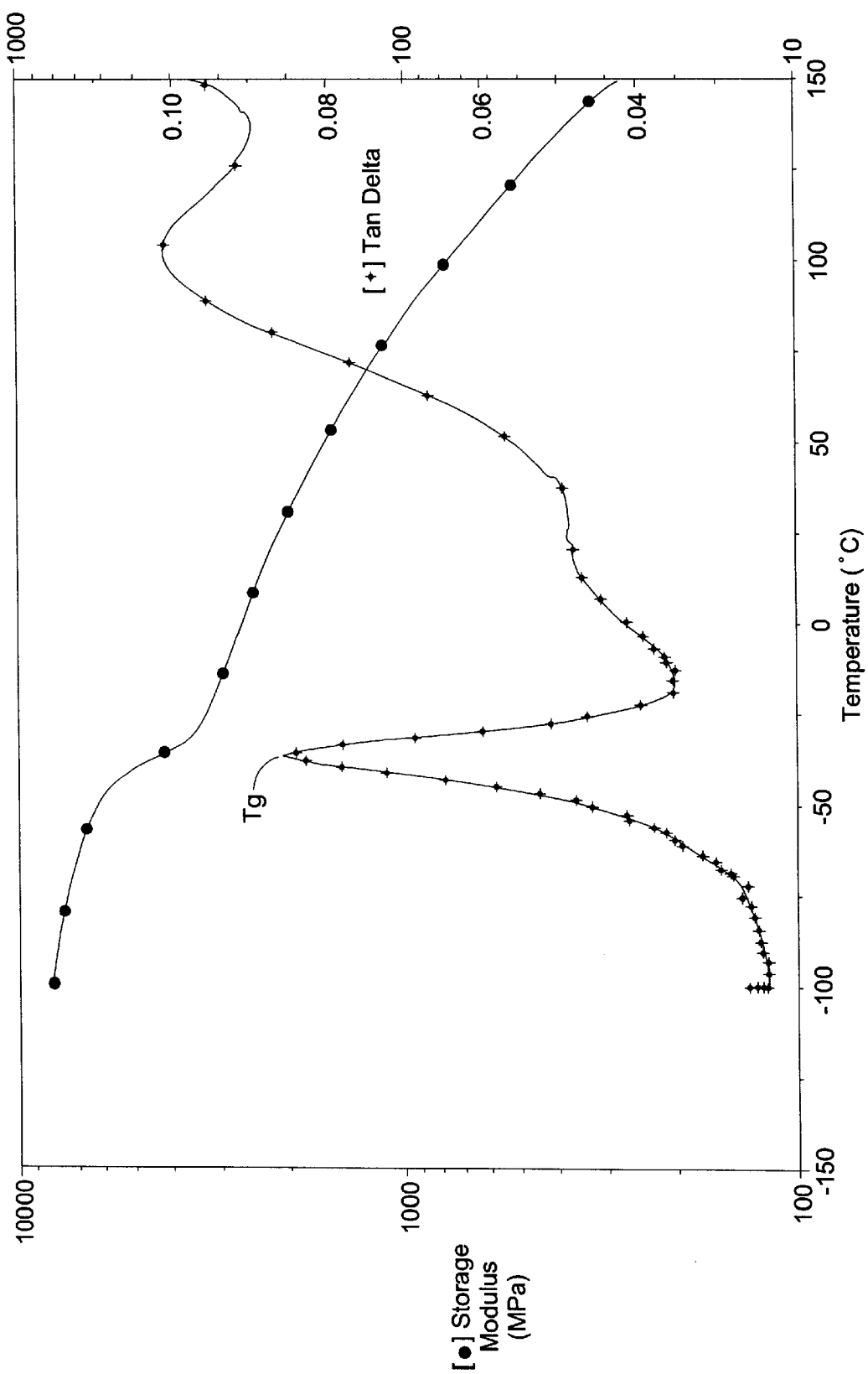
FIG. 4 is a graph plotting modulus versus temperature for the preferred buffer material.

Referring now in more detail to the drawings, in which like numerals indicate like parts throughout the several views, FIGS. 1–2 illustrate a buffered optical fiber 10 constructed in accordance with the present invention. As indicated in these figures, the buffered optical fiber 10 generally comprises a coated optical fiber 12 which is covered by a buffer layer 14. The coated optical fiber 12 includes a cladded glassy core 16 that, as shown in FIGS. 1 and 2, normally is encased in an inner and an outer coating layer 20 and 22, respectively. It is to be understood, however, that only one such coating layer or more than two such coating layers alternatively could be used depending upon the particular application in which the buffered optical fiber 10 will be used. Where two coating layers are used, the inner coating layer 20 typically is softer, and therefore has a lower modulus, than the outer coating layer 22. This arrangement cushions the core 16 against microbending forces which can add to transmission losses, and also protects the core against abrasion. Although capable of alternative composition, the inner and outer coating layers 20 and 22 both typically are formed of an acrylate material and, when plied together on the core 16, form a coated optical fiber having a diameter of approximately 10 mils (~250 μm).

The buffer layer 14 typically is composed of a polymeric material having high modulus and high flame resistance. For the reasons explained hereinafter, particularly preferred for construction of the buffer layer 14 is a polyvinylidine fluoride (PVDF) material. PVDF is comprised of repeating units of the monomer vinylidene diflouride ($VF_2$) which has the chemical structure:

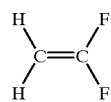

[1]

In a preferred arrangement, the buffer layer 14 comprises a homopolymer of PVDF currently available from Solvay Polymers, Inc. of Houston, Tex. under the name SOLEF 6007. The SOLEF 6007 composition of PVDF has a flexural modulus of approximately 319,000 pounds per square inch (psi) as per ASTMD 790, and a melt flow index (MFI) of approximately 8 as per ASTMD 1238 at 230° C. with a 2.16 kilogram (kg) load. The buffer layer 14 usually is applied directly onto the coated optical fiber 12 through a tubing extrusion process. Normally, the buffer layer 14 has a thickness of approximately 12.5 mils (~318 μm) such that the produced buffered optical fiber 10 has a diameter of approximately 35 mils (~900 μm).

Illustrated in FIG. 3 is an alternative embodiment of a buffered optical fiber 24 constructed in accordance with the present invention. This buffered optical fiber 24 is similar in design to that shown in FIGS. 1 and 2 and therefore includes a cladded glassy core 26 that is covered by first and second coating layers 30 and 32, respectively, and by a buffer layer 34 constructed of a material similar to that of the buffer layer 14 shown in FIGS. 1 and 2. Positioned between the buffer layer 34 and the cladding 18 in the alternative embodiment, however, is a boundary layer 36 similar in construction to that disclosed in U.S. Pat. No. 5,684,910 ("the '910 patent"), issued in the name of Chapin et al., which is hereby incorporated by reference into the present disclosure. As described in the '910 patent, this boundary layer 36 typically is composed of a relatively soft material which facilitates stripping of the buffered optical fiber for connectorization.

The particular advantages presented by the disclosed buffered optical fibers 10 and 24 best can be appreciated in view of the physical properties attained when the fiber is constructed in accordance with the present disclosure and, more particularly, when the fiber is provided with a buffer layer composed of a homopolymer PVDF. As described above, the buffered optical fiber of the present disclosure exhibits both high modulus and high flame resistance. Exemplary of the degree of fiber stiffness attainable with the use of the preferred buffer layer, FIG. 4 is a graph that plots Young's modulus (E) versus temperature (°C.) for the preferred buffer material. As indicated by this graph, the inventive buffer material exhibits a Young's modulus of approximately 2000 megapascals (Npa) at approximately 25° C. (near room temperature). Accordingly, the buffered optical fiber of the present invention maintains high modulus in plenum applications. In addition to plotting modulus versus temperature, the graph of FIG. 4 also indicates a glass transition temperature, Tg, of approximately −40° C. As a result of this low Tg, the buffer material, while maintaining high modulus, is extremely pliable so as to facilitate the manufacturing process. Due to the high modulus of the buffer layer material, the buffered optical fiber constructed therewith can be more easily connectorized.

In regard to flame resistance, optical fiber cables constructed with the buffered optical fibers described herein fully comply with UL 910, fifth edition. Indeed, such optical fiber cables far surpass the minimum requirements established by UL 910. As is known in the art, plenum cable in compliance with UL 910 must exhibit a flame spread of no more than 5 feet (ft.), a peak optical density no greater than 0.5, and an average optical density no greater than 0.15. As is apparent from Table I, these values for a PVC jacketed cable including optical fibers buffered with the preferred buffer material were no more than 1.5 ft., 0.27, and 0.06, respectively. Moreover, through UL testing, the buffered optical fibers of the present disclosure have been separately identified by Underwriter's Laboratory as a "recognized component" for optical fiber cable and cordage construction. This distinction is significant in that, at the time of filing, no other PVDF buffered optical fiber has been so recognized by Underwriter's Laboratories.

TABLE I

| Test # | Flame Spread (ft.) | Peak Optical Density | Average Optical Density |
| --- | --- | --- | --- |
| 1 | 1.5 | 0.27 | 0.06 |
| 2 | 1.5 | 0.22 | 0.06 |

The superior flame resistance of the buffered optical fibers of the present invention is further evident when the results of tests conducted according to ASTM D3286 are reviewed. In ASTM D3286, sample fibers are placed inside what is known as an oxygen bomb calorimeter. Inside the calorimeter, the fiber is pressurized until the fiber explodes into flame at which time the heat released from the fiber is measured. The buffered optical fiber of the present invention displayed a heat of combustion of approximately 6534 Btu/lb. As will be appreciated by persons of skill in the art, this value is indicative of substantial flame resistance. By way of comparison, nylon buffered fibers typically exhibit a heat of combustion of approximately 15,000 Btu/lb., while PVC exhibits heats of combustion in the range of approximately 6000–14,000 Btu/lb. However, the lower end of the range for PVC is only possible through the addition of flame retardants and/or smoke suppressants.

Figure 5:
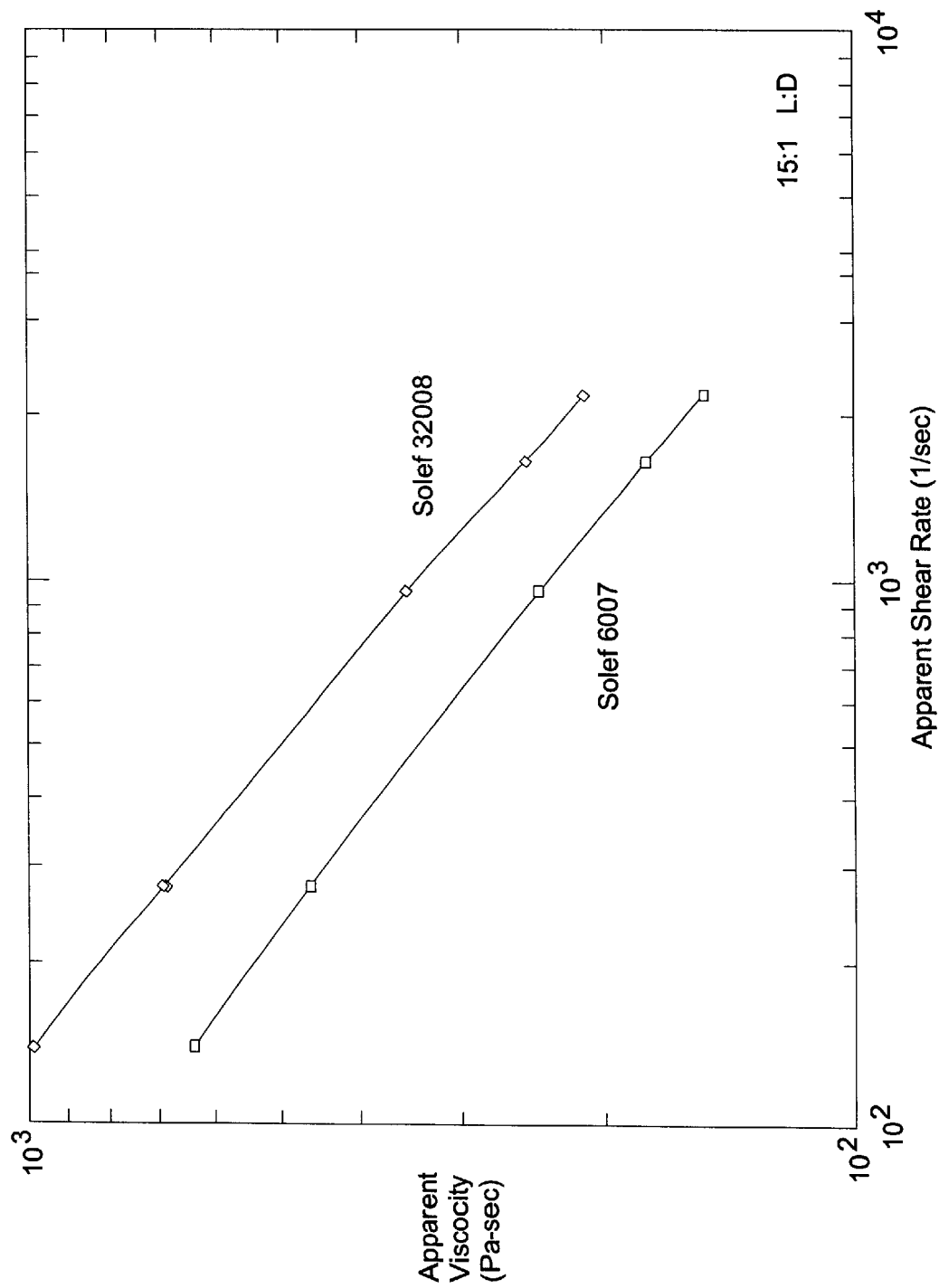
FIG. 5 is a graph plotting viscosity versus shear rate for the preferred buffer material.

As mentioned in the foregoing background of the invention, several other requirements in addition to modulus and flame resistance requirements must also be satisfied if an optical fiber design is to be successful. Among these requirements are transmission, chemical resistance, and strippability concerns. Regarding transmission requirements, the buffered optical fiber must be highly uniform so as to minimize the presence of voids, bubbles, or other imperfections along the interface between the fiber cladding and buffer layer which distort the transmission axis of the fiber and create bending loss. The degree of uniformity obtained relates primarily to the manufacturing process. Specifically, bubbles can form when the buffer layer is drawn onto the coated optical fiber through the extrusion process due, in large part, to the viscosity of the buffer material. Lower viscosity translates into easier extrusion in that materials of low viscosity are more fluid in nature. FIG. 5 plots apparent viscosity versus apparent shear rate for the buffer material of the present material, SOLEF 6007, and for another material which has been commonly used for the construction of buffer layers, SOLEF 32008. In particular, this material is known to extrude easily to form the buffer layer on a coated optical fiber. As indicated by the plots of FIG. 5, the preferred buffer material exhibits a viscosity similar to that of the SOLEF 32008 material. Accordingly, the preferred buffer material likewise has been found to be easily extrudable.

In addition to the attractive physical attributes described in the foregoing, the buffer layer material of the present invention further is highly chemically resistant. More specifically, the homopolymer form of PVDF implemented in the present invention has been found to be more chemically resistant than copolymers of PVDF. In addition, with regard to mechanical strippability, the buffered optical fiber according to the present invention has desirable strippability properties. In particular, the stripping force for the buffered optical fiber falls within the 0.4 lb. to 3.0 lb. requirements established by EIA-455-178.

While preferred embodiments of the invention have been disclosed in detail in the foregoing description and drawings, it will be understood by those skilled in the art that variations and modifications thereof can be made without departing from the spirit and scope of the invention as set forth in the following claims.

What is claimed is:

1. A plenum rated, high modulus buffered optical fiber, comprising:
   a cladded glassy core through which optical signals can be transmitted;
   at least one coating layer surrounding said cladded glassy core which protects said core from microbending forces; and
   a buffer layer material being extruded, said buffer layer material surrounding said at least one coating layer to form a buffer layer that protects said coated optical fiber from mechanical forces and from flame, said buffer layer material comprising a homopolymer of polyvinylidine fluoride.

2. The buffered optical fiber of claim 1, wherein said buffer layer material has a flexural modulus of approximately 319,000 psi as per ASTM 790.

3. The buffered optical fiber of claim 1, wherein said buffer layer material has a melt flow index of approximately 8 as per ASTMD 1238 at 230° C. with a 2.16 kg load.

4. The buffered optical fiber of claim 1, wherein said buffer layer material has a Young's modulus of approximately 2000 Mpa at approximately 25° C.

5. The buffered optical fiber of claim 1, wherein said buffer layer material has a glass transition temperature of approximately −40° C.

6. The buffered optical fiber of claim 1, wherein said buffered optical fiber exhibits a heat of combustion of approximately 6534 Btu/lb. When tested in accordance with ASTM D3286.

7. The buffered optical fiber of claim 1, wherein said buffered optical fiber qualifies as a UL recognized component.

8. The buffered optical fiber of claim 1, wherein said buffer layer material comprises SOLEF 6007.

9. A plenum rated optical fiber cable, comprising:
   a plenum rated, high modulus optical fiber including:
      a cladded glassy core through which optical signals can be transmitted,
      at least one coating layer surrounding said cladded glassy core which protects said core from microbending forces, and
      a buffer layer material being extruded, said buffer layer material surrounding said at least one coating layer to form a buffer layer that protects said coated optical fiber from mechanical forces and from flame, said buffer layer material comprising a homopolymer of polyvinylidine fluoride.

10. The cable of claim 9, wherein said cable exhibits a flame spread of no more than approximately 2 ft. when tested in accordance with UL910.

11. The cable of claim 9, wherein said cable exhibits a peak optical density of no more than approximately 0.3 when tested in accordance with UL 910.

12. The cable of claim 9, wherein said cable exhibits an average optical density of no more than approximately 0.1 when tested in accordance with UL 910.

13. The cable of claim 9, wherein said buffer layer material comprises SOLEF 6007.

14. A plenum rated, high modulus buffered optical fiber, comprising:
   a cladded glassy core through which optical signals can be transmitted;
   at least one coating layer surrounding said cladded glassy core which protects said core from microbending forces; and a buffer layer material surrounding said at least one coating layer to form a buffer layer that protects said coated optical fiber from mechanical forces and from flame, said buffer layer material comprising a homopolymer of polyvinylidine fluoride and having a flexural modulus of approximately 319,000 psi as per ASTMB 790.

15. A plenum rated, high modulus buffered optical fiber, comprising:

a cladded glassy core through which optical signals can be transmitted;

at least one coating layer surrounding said cladded glassy core which protects said core from microbending forces; and a buffer layer material surrounding said at least one coating layer to form a buffer layer that protects said coated optical fiber from mechanical forces and from flame, said buffer layer material comprising a homopolymer of polyvinylidine fluoride exhibiting a heat of combustion of approximately 6534 Btu/lb. when tested in accordance with ASTM D32868.

16. A plenum rated, high modulus buffered optical fiber, comprising:

a cladded glassy core through which optical signals can be transmitted;

at least one coating layer surrounding said cladded glassy core which protects said core from microbending forces; and a buffer layer material surrounding said at least one coating layer to form a buffer layer that protects said coated optical fiber from mechanical forces and from flame, said buffer layer material comprising a homopolymer of polyvinylidine fluoride comprising SOLEF 6007.

17. A plenum rated optical fiber cable, comprising:

a plenum rated, high modulus optical fiber including:

a cladded glassy core through which optical signals can be transmitted, at least one coating layer surrounding said cladded glassy core which protects said core from microbending forces, and a buffer layer material surrounding said at least one coating layer to form a buffer layer that protects said coated optical fiber from mechanical forces and from flame, said buffer layer material comprising a homopolymer of polyvinylidine fluoride comprising SOLEF 6007.

* * * * *